United States Patent
Szabó et al.

(10) Patent No.: US 12,483,630 B2
(45) Date of Patent: Nov. 25, 2025

(54) METHOD AND APPARATUS FOR INTERACTING BETWEEN VERTICAL APPLICATION LAYER AND SERVICE ENABLER ARCHITECTURE LAYER

(71) Applicant: TELEFONAKTIEBOLAGET LM ERICSSON (PUBL), Stockholm (SE)

(72) Inventors: Géza Szabó, Kecskemét (HU); József Petö, Mezökövesd (HU)

(73) Assignee: TELEFONAKTIEBOLAGET LM ERICSSON, Stockholm (SE)

(*) Notice: Subject to any disclaimer, the term of this patent is extended or adjusted under 35 U.S.C. 154(b) by 53 days.

(21) Appl. No.: 18/634,404

(22) Filed: Apr. 12, 2024

(65) Prior Publication Data
US 2024/0430331 A1 Dec. 26, 2024

Related U.S. Application Data

(60) Provisional application No. 63/522,904, filed on Jun. 23, 2023.

(51) Int. Cl.
*G06F 15/173* (2006.01)
*H04L 41/0894* (2022.01)
(Continued)

(52) U.S. Cl.
CPC ...... *H04L 67/2866* (2013.01); *H04L 41/0894* (2022.05); *H04L 41/16* (2013.01); *H04L 41/5067* (2013.01)

(58) Field of Classification Search
CPC . H04L 67/2866; H04L 41/0894; H04L 41/16; H04L 41/5067
See application file for complete search history.

(56) References Cited

U.S. PATENT DOCUMENTS

2025/0168063 A1* 5/2025 Atarius ............... H04L 41/0893

OTHER PUBLICATIONS

ITU-T, P.800.1, SERIES P: Telephone Transmission Quality, Telephone Installations, Local Line Networks,, Methods for Objective and subjective assessment of quality, Mean Opinion Score (MOS) terminology, 12 pages, Mar. 2003, International Telecommunication Union.

(Continued)

*Primary Examiner* — Joseph R Maniwang
(74) *Attorney, Agent, or Firm* — ERICSSON INC.

(57) ABSTRACT

According to an aspect, there is provided a method for execution by a SEAL (Service Enabler Architecture Layer) service server of a network. The method involves determining a communication policy based on at least one KPI (Key Performance Indicator). The method also involves communicating, via the network, with a SEAL client of a communications device, in accordance with the communication policy. In some implementations, the SEAL service server is part of a SEAL layer, and the method also involves receiving feedback from a VASEAL (Vertical Application Service Enabling Architecture Layer) layer which is separate from the SEAL layer, and controlling the VASEAL layer and/or adjusting the communication policy based in part on the feedback. Thus, method can enable control on the network towards a SEAL layer which can allow capabilities of the SEAL layer to be extended to consume VASEAL layer information and provide control to the VASEAL layer.

20 Claims, 13 Drawing Sheets

(51) Int. Cl.
    *H04L 41/16*     (2022.01)
    *H04L 41/5067*     (2022.01)
    *H04L 67/2866*     (2022.01)

(56) References Cited

OTHER PUBLICATIONS

R. Enns et al, RFC6241, Internet Engineering Task Force (IETF), Network Configuration Protocol (NETCONF), Standards Track, 113 pages, Jun. 2011.

\* cited by examiner

METHOD AND APPARATUS FOR INTERACTING BETWEEN VERTICAL APPLICATION LAYER AND SERVICE ENABLER ARCHITECTURE LAYER

RELATED APPLICATION

This application claims priority to U.S. provisional application No. 63/522,904 filed on Jun. 23, 2023, the entire disclosure of which being incorporated by reference in its entirety.

FIELD OF THE DISCLOSURE

This disclosure relates to communication systems, and more particularly to packet flow in communication systems.

BACKGROUND

A traditional way of configuring cellular networks is via their O&M (Operations and Maintenance) interfaces which are command-line tools or based on NetConf (Network Configuration Protocol). These interfaces can typically be used by network operators only, hence a factory normally issues a CSR (Customer Service Request) to a CSP (Cloud Solution Provider) for each change. Handling of CSRs typically involves several manual steps and hence it is a time-consuming procedure. Some simpler configuration steps can be automated by the factory using APIs (Application Programmer Interfaces) for an NEF (Network Exposure Function). These APIs are specified by 3GPP (3rd Generation Partnership Project).

While the NEF was a novel feature in Release 15 of 3GPP, it had an inherent issue due to an offline configuration of Northbound APIs, namely that API discovery was not supported and API behavior led to fragmentation. Soon after the NEF was introduced, CAPIF (Common API Framework) was defined in order to establish a single and harmonized platform for all 3GPP Northbound APIs.

CAPIF related work happened via 3GPP in TSG SA (Technical Specification Group Service and System Aspects) WG6 (Working Group 6), which is an application enablement and critical communication applications group for vertical markets. The main objective of the SA WG6 is to provide application layer architecture specifications for 3GPP verticals, including architecture requirements, functional architecture, procedures, information flows, interworking with non-3GPP application layer solutions, and deployment models as appropriate.

While the NEF provides a low-level programmability of networks, there was room to improve its user or application developer-friendliness, and a common set of capabilities for 5G verticals was identified. SEAL (Service Enabler Architecture Layer) is defined in 3GPP TS 23.434, "Service Enabler Architecture Layer for Verticals (SEAL); Functional architecture and information flows", version 18.5.0 (2023 Jun. 21), which specifies APIs for provisioning, connection management, device management, connection monitoring, group management, user profile retrieval, identity and key management, location reporting, events, and NRM (Network Resource Management).

Various exposure APIs provide various levels of access to a network function. For example, when comparing the NEF APIs and the SEAL APIs for a robotics use case, it might be concluded that application of a SEAL exposure interface demonstrates a drastically simplified system integration of industrial 5G devices. SEAL can be utilized with VAL (Vertical Application Layer).

SUMMARY OF THE DISCLOSURE

According to an aspect, there is provided a method for execution by a SEAL (Service Enabler Architecture Layer) service server of a network. The method involves determining a communication policy based on at least one KPI (Key Performance Indicator). The method also involves communicating, via the network, with a SEAL client of a communications device, in accordance with the communication policy.

By enabling the SEAL service server to determine and use the communication policy, the method enables control on the network towards a SEAL layer. This can allow capabilities of the SEAL layer to be extended to consume VASEAL (Vertical Application Service Enabling Architecture Layer) layer information and provide control to the VASEAL layer.

In some implementations, the SEAL service server determines the communication policy by implementing machine learning to identify the communication policy out of a plurality of possible communication policies which maximizes a reward function based on the at least one KPI. In some implementations, the at least one KPI includes at least some of MOS (Mean Opinion Score) representing quality, latency of communication, and/or packet drop of communication. Other implementations are possible.

By implementing machine learning, the SEAL service server can determine a suitable or optimal communication policy that may better achieve the KPIs, e.g. high MOS, low latency, and little or no packet drops.

In some implementations, the SEAL service server is part of a SEAL layer, and the method also involves receiving feedback from a VASEAL layer which is separate from the SEAL layer, and controlling the VASEAL layer and/or adjusting the communication policy based in part on the feedback. In some implementations, the feedback is received via an interface that translates a format of the feedback (e.g. ROS2 topic to HTTP push) from resource monitoring and resource management functions of the VASEAL layer. Other implementations are possible.

By receiving the feedback, the control on the network towards the SEAL layer can be enhanced, for example to better achieve the KPIs noted above. The interface that performs the translation helps to facilitate such enhancement.

According to another aspect, there is provided a non-transitory computer readable medium having recorded thereon statements and instructions that, when executed by a processor of a SEAL service server, configure the SEAL service server to implement a method as summarized above.

According to another aspect, there is provided a SEAL service server. The SEAL service server has a network interface configured to communicate with other network nodes, and circuitry coupled to the network interface and configured to implement a method as summarized above.

According to another aspect, there is provided a method for execution by a VASEAL service server of a network, wherein the VASEAL service server is part of a VASEAL layer. The method involves monitoring at least one KPI, and sending feedback to a SEAL layer which is separate from the VASEAL layer based on the at least one KPI. In some implementations, the feedback is sent via an interface that translates a format of the feedback (e.g. ROS2 topic to HTTP push) from resource monitoring and resource management functions of the VASEAL layer. Other implementations are possible.

According to another aspect, there is provided a non-transitory computer readable medium having recorded thereon statements and instructions that, when executed by a processor of a VASEAL service server, configure the VASEAL service server to implement a method as summarized above.

According to another aspect, there is provided a VASEAL service server. The VASEAL service server has a network interface configured to communicate with other network nodes, and circuitry coupled to the network interface and configured to implement a method as summarized above.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
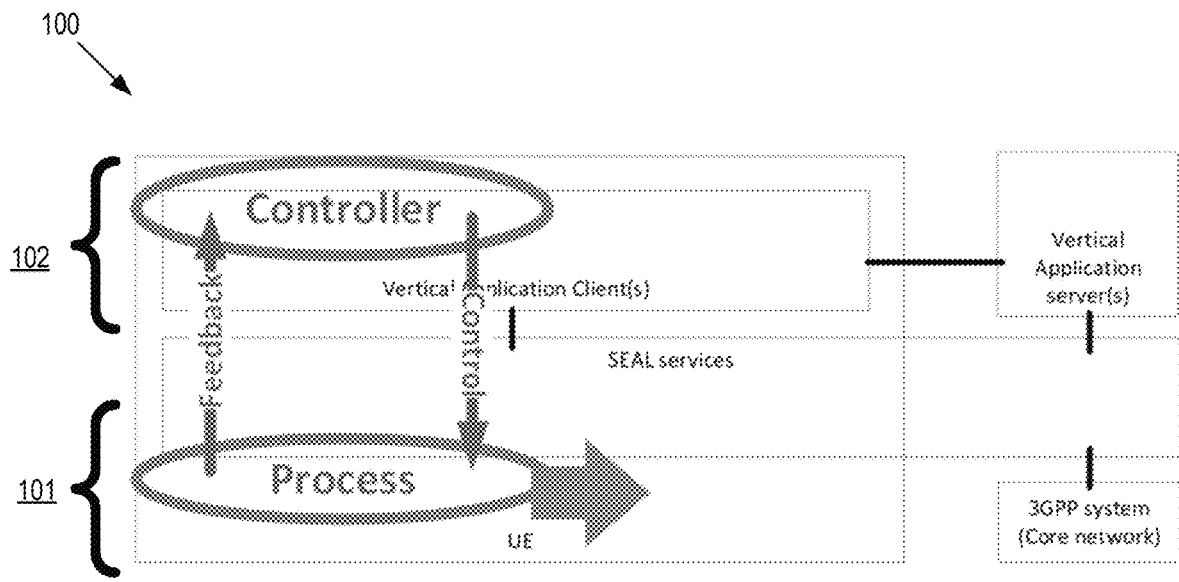
FIG. 1 is a block diagram of a communication system in which a SEAL layer provides both information and control on a network towards a VAL layer.

Referring first to FIG. 1, shown is a block diagram of a communication system 100 in which a SEAL layer 101 provides both information and control on a network towards a VAL layer 102. In this way, the exposure consumer is the VAL layer 102, whereas exposure producers are the network functions that provide the services that are exposed to consumers.

To be able to eventually provide smart network solutions, the other way of information and control is a desired extension or addition. There can be cases (e.g., overloaded network when the network can not solve the root cause of load by altering network functions) in which cooperation with the application layer is desired.

Figure 2:
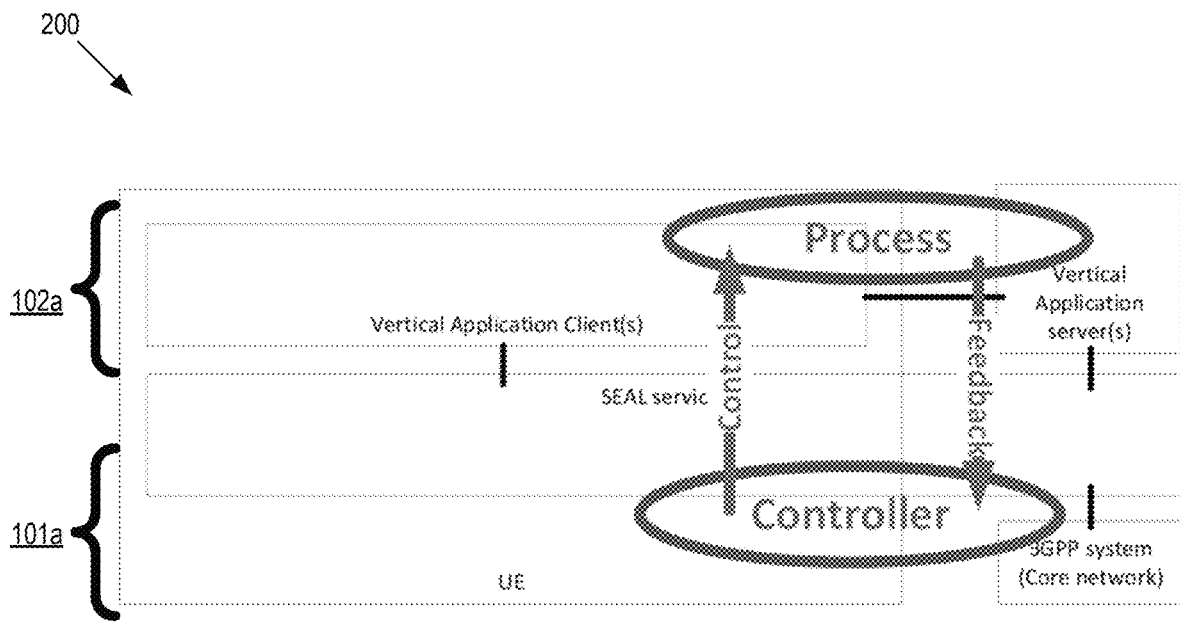
FIG. 2 is a block diagram of a communication system in which a VAL layer provides both information and control on a network towards a SEAL layer.

Referring now to FIG. 2, shown is a block diagram of a communication system 200 in which a VAL layer 102a provides both information and control on a network towards a SEAL layer 101a. In this way the exposure consumer is the 5G network, whereas exposure producers are the vertical application functions that provide the services that are exposed to consumers. In contrast to FIG. 1, FIG. 2 shows the other way of information and control.

The VAL layer 102a in FIG. 2 is hereinafter referred to as VASEAL (Vertical Application Service Enabling Architecture Layer), because it enables both information and control on the network towards the SEAL layer 101a. According to FIG. 2, capabilities of the SEAL layer 101a are extended with features to consume information from the VASEAL layer 102a and provide control to the VASEAL layer 102a.

It is to be understood that a combination of FIGS. 1 and 2 is possible and is within the scope of this disclosure. In particular, a communication system can support both information and control on a network towards a VAL layer 102 (i.e. FIG. 1), and also support both information and control on the network towards a SEAL layer 101a (i.e. FIG. 2).

Some embodiments extend the capabilities of VAL applications with adaptive behavior in cooperation with the network make room for smart application management functions from the network towards the application. Some embodiments can provide acceptable performance of the industrial application even in case of overloaded network by cooperating with the VAL layer.

Figure 3:
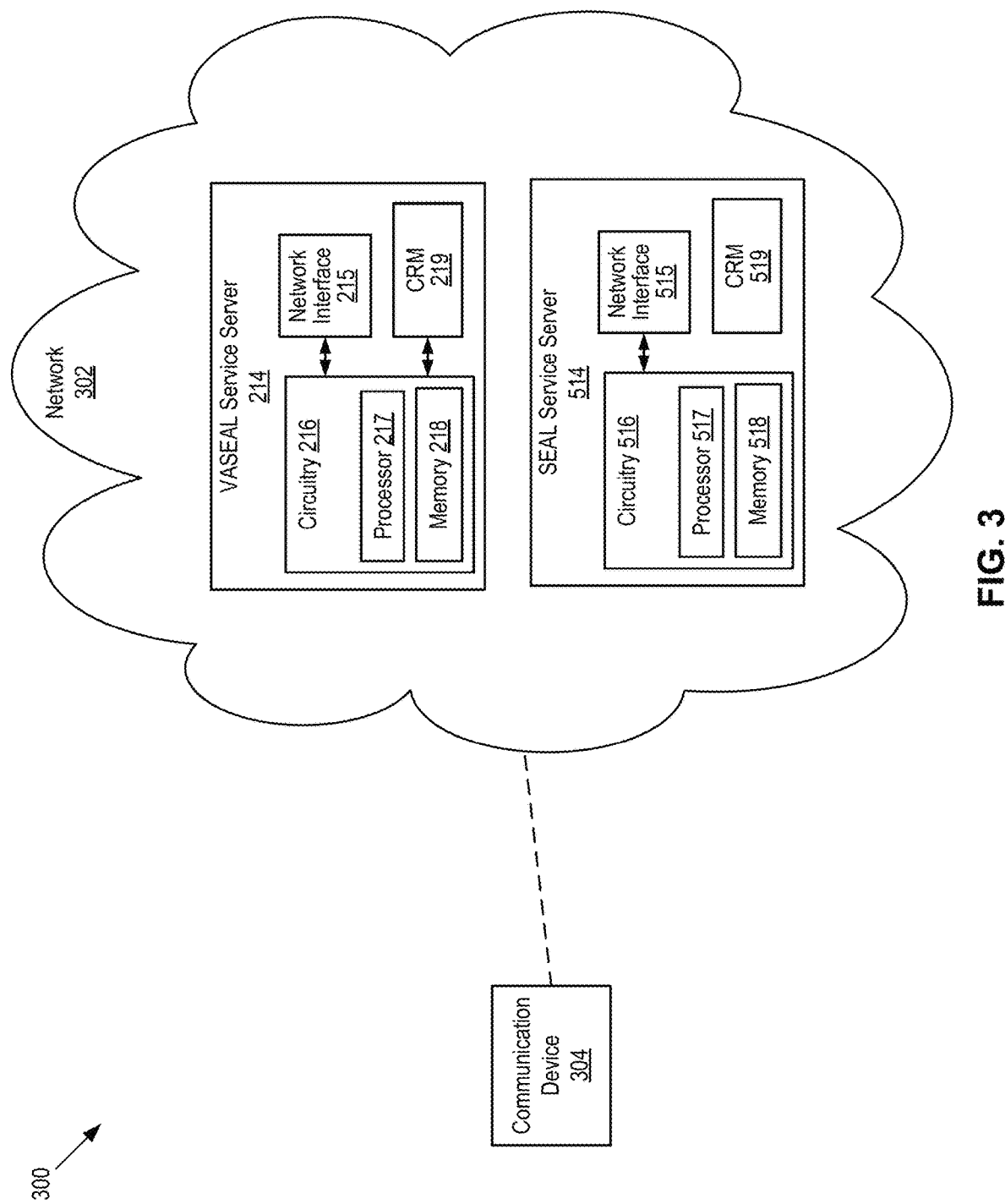
FIG. 3 is a block diagram of a communication system having a network with a VASEAL service server and a SEAL service server.

Referring now to FIG. 3, shown is a block diagram of a communication system 300 having a network 302 with a VASEAL service server 214 and a SEAL service server 514. The VASEAL service server 214 is logically part of a VASEAL layer (not shown in FIG. 3) while the SEAL service server 514 is logically part of a SEAL layer (not shown in FIG. 3) as similarly shown in FIG. 2. In some implementations, a communication device 304 communicates with the servers 214 and 514 over the network 302 via the SEAL layer and/or the VAL layer. Other implementations are possible.

Each server 214 and 514 is shown as a single node. However, it is to be understood that each server 214 and 514 can include a combination of separate nodes which cooperate with one another. Also, while the servers 214 and 514 are shown as separate nodes, in alternative implementations the servers 214 and 514 form a single node. Also, there may be additional nodes of the network 302 beyond the servers 214 and 514 that are shown. Also, although only one communication device 304 is shown, normally there would be numerous communication devices, but they are not shown for simplicity. It is noted that the communication system 300 may have additional components that are not shown for simplicity.

Each server 214,514 has a network interface 215,515 configured to communicate with other nodes of the communication system 300, a computer readable medium 219, 519, and circuitry 216,516 coupled to the network interface 215,515 and the computer readable medium 219,519. In some implementations, the circuitry 216,516 includes a processor 217,517 that executes software, which can stem from a memory 218,518 and/or the computer readable medium 219,519. However, other implementations are possible and are within the scope of this disclosure. Each server 214,514 can have additional components, but these are not shown for simplicity.

Figure 5:
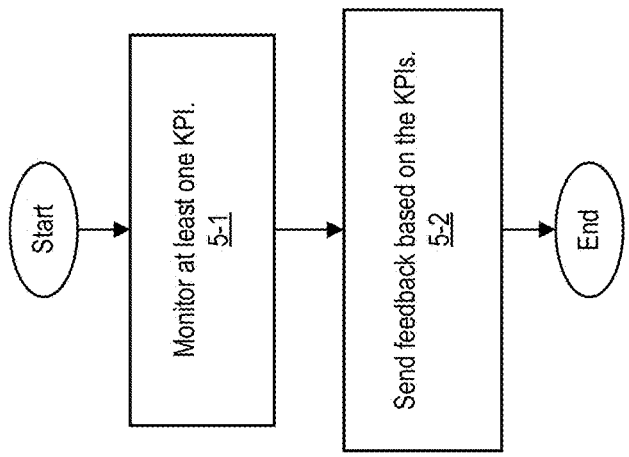
FIGS. 4 and 5 are flowcharts of methods of interacting between VASEAL and SEAL layers.
Figure 4:
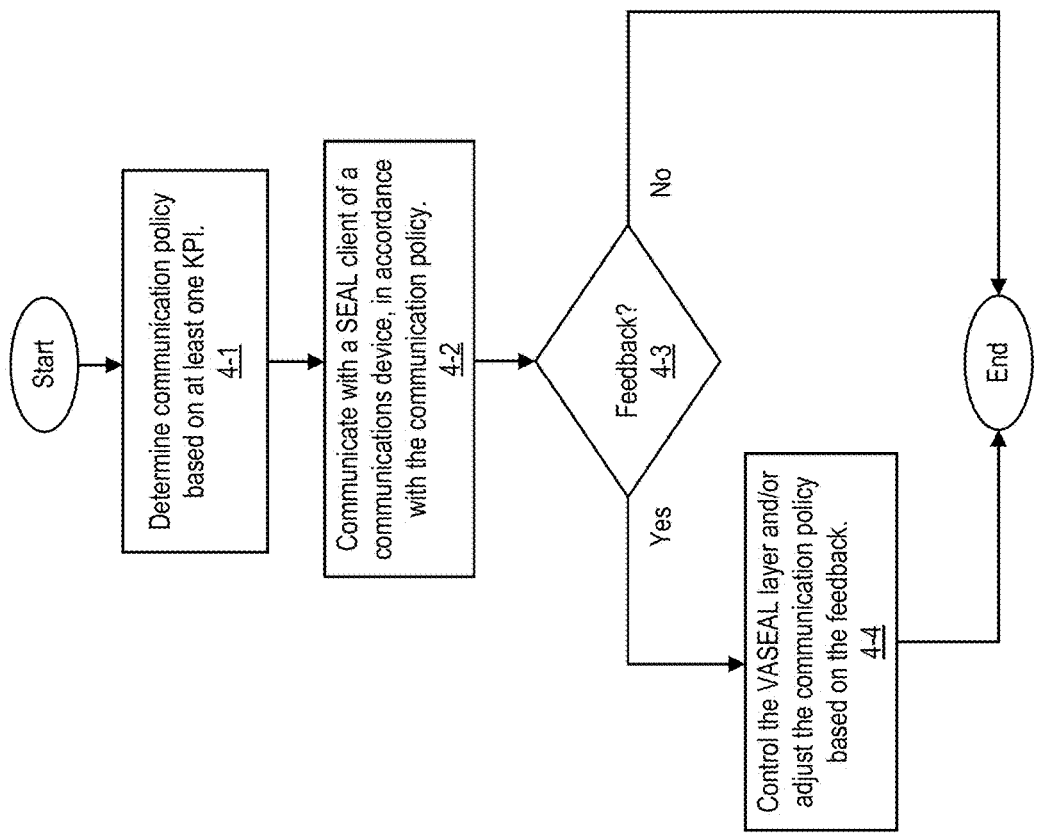

The circuitry 216,516 of the servers 214,514 operate to implement methods of interacting between VASEAL and SEAL layers. Such operation will be described below with reference to FIGS. 4 and 5. Although the methods of FIGS. 4 and 5 are described below with reference to the communication system 300 shown in FIG. 3, it is to be understood that the methods of FIGS. 4 and 5 are applicable to other communication systems. In general, the methods of FIGS. 4 and 5 are applicable to any appropriately configured communication system.

Referring first to FIG. 4, at step 4-1 the SEAL service server 514 determines a communication policy based on at least one KPI. There are many possibilities for the KPIs. In some implementations, the KPIs include MOS representing quality, latency of communication, and/or packet drop of communication. In some implementations, the MOS is determined based on input from a user as described later with reference to FIG. 6. In other implementations, the MOS is measured. In some implementations, latency and packet drops are measured or detected as described later with reference to FIG. 6. Other implementations are possible.

At step 4-2, the SEAL service server 514 communicates, via the network 302, with a SEAL client of the communications device 304, in accordance with the communication policy. By enabling the SEAL service server 514 to determine and use the communication policy, the method enables control on the network towards a SEAL layer. This can allow capabilities of the SEAL layer to be extended to consume VASEAL layer information and provide control to the VASEAL layer.

In some implementations, the SEAL service server 514 is part of a SEAL layer, and at step 4-3 the SEAL service server 514 can receive feedback from a VASEAL layer which is separate from the SEAL layer. If such feedback is received at step 4-3, then at step 4-4 the SEAL service server 514 can control the VASEAL layer and/or adjust the communication policy based in part on the feedback. By receiving the feedback, the control on the network towards the SEAL layer can be enhanced, for example to better achieve the KPIs noted above.

In some implementations, the feedback is received via an interface that translates a format of the feedback (e.g. ROS2 topic to HTTP push) from resource monitoring and resource management functions of the VASEAL layer. Other implementations are possible.

There are many ways that the SEAL service server 514 can determine the communication policy. In some implementations, the SEAL service server 514 determines the communication policy by implementing machine learning to identify the communication policy out of a plurality of possible communication policies which maximizes a reward function based on the at least one KPI. By implementing machine learning, the SEAL service server can determine a suitable or optimal communication policy that may better achieve the KPIs, e.g. high MOS, low latency, and little or no packet drops. However, other implementations are possible, including implementations that do not use machine learning.

Referring now to FIG. 5, at step 5-1 the VASEAL service server 214 monitors at least one KPI. Examples of those KPIs have been described above. Next, at step 5-2 the VASEAL service server 214 sends feedback to the SEAL service server 514 of the SEAL layer based on the at least one KPI. In some implementations, the feedback is sent via an interface that translates a format of the feedback (e.g. ROS2 topic to HTTP push) from resource monitoring and resource management functions of the VASEAL layer. Other implementations are possible.

There are many possibilities for the network 302 of FIG. 3. In some implementations, the network 302 includes a 5G (Fifth Generation) network. However, other implementations are possible including implementations outside of 5G implementations.

According to another embodiment of the disclosure, there is provided a non-transitory computer readable medium having recorded thereon statements and instructions that, when executed by the processor, implement a method as described herein. The non-transitory computer readable medium can be the memory 218 (or 518) and/or the computer readable medium 219 (or 519), or some other non-transitory computer readable medium.

Examples of a non-transitory computer readable medium include memory, an SSD (Solid State Drive), a hard disk drive, a CD (Compact Disc), a DVD (Digital Video Disc), a BD (Blu-ray Disc), a memory stick, etc. Other non-transitory computer readable mediums are also possible.

The illustrated examples described herein focus on software implementations. However, other implementations are possible and are within the scope of this disclosure. It is noted that other implementations can include additional or alternative hardware components, such as any appropriately configured FPGA (Field-Programmable Gate Array), ASIC (Application-Specific Integrated Circuit), and/or microcontroller, for example. Thus, the circuitry 216 (or 516) can instead be implemented with any suitable combination of hardware, software and/or firmware.

Further example details are provided in the following sections. It is to be understood that the following sections are very specific and are provided merely for exemplary purposes, such that other implementations are possible and within the scope of the disclosure.

Example Implementation

Figure 6:
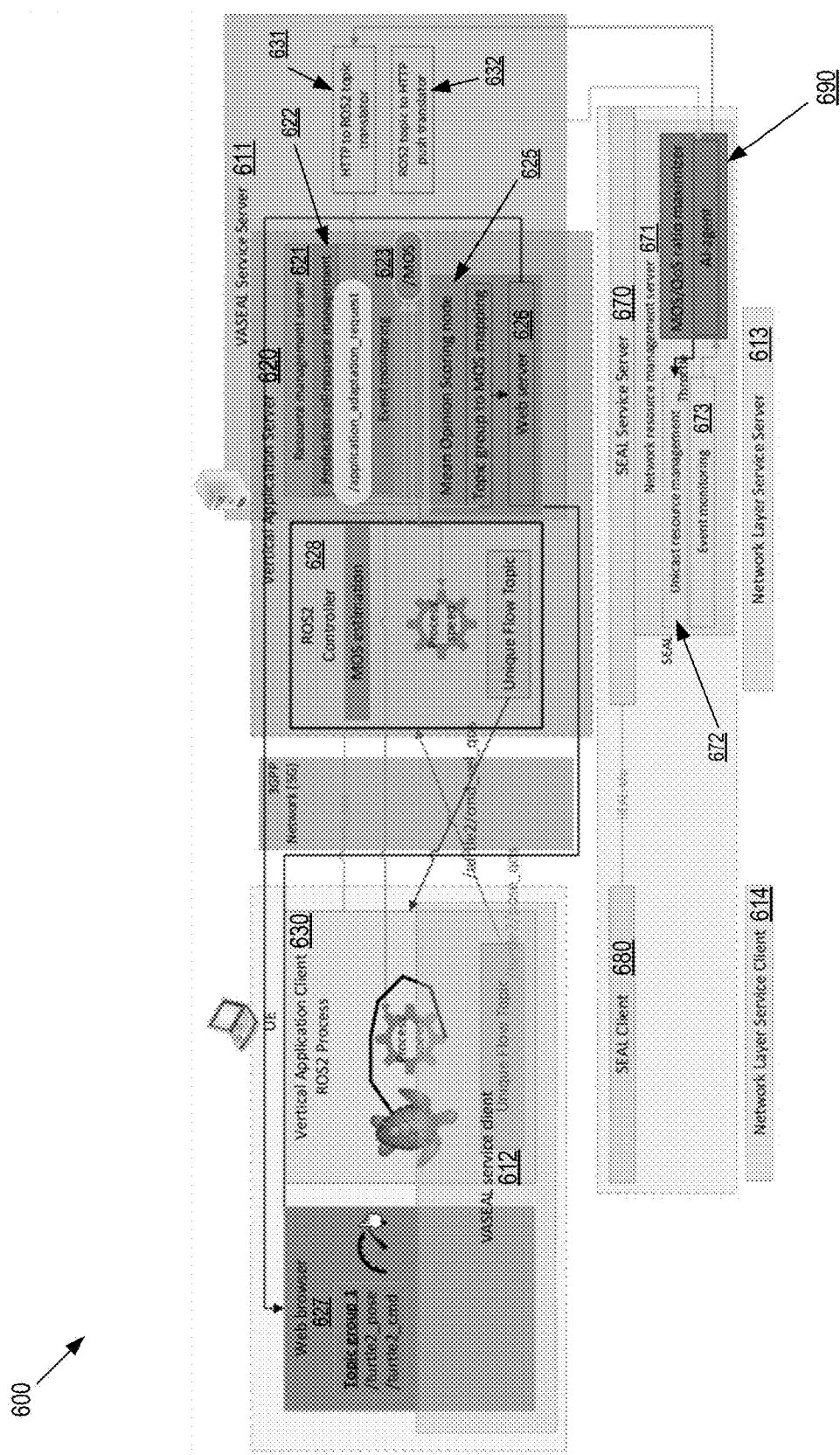
FIG. 6 is a block diagram of a communication system with a VASEAL architecture having a VASEAL layer which exposes the VAL layer towards the network.

Referring now to FIG. 6, shown is a block diagram of a communication system 600 with a VASEAL architecture having a VASEAL layer 611-614 which exposes a VAL layer towards the network. The VASEAL layer 611-614 has four main components: VASEAL Service Server 611 and Client 612 and their respective network side nodes, the Network Layer Service Server 613 and Client 614.

According to some embodiments, a set of nodes are introduced in the VAL layer including resource monitoring and resource management functions. The VASEAL Service Server 611 runs next to a Vertical Application Server 620 hosting a Resource Management Server 621 and Event Monitoring 623 for a production cell 622 or other VAL application. The VASEAL Service Client 612 runs next to the Vertical Application client 630 running a GUI for data collection of the event monitoring. The Network Layer Service Client 614 runs next to the SEAL Client 680. The Network Layer Service Server 613 runs next to the SEAL Service Server 670.

While the VASEAL Service Server 611 operates in the VAL layer, it is desired to use the VAL layer specific protocol either it is ROS2, OPC-UA, etc. The SEAL layer can communicate through HTTP (Hypertext Transfer Protocol) protocol, thus transformation in the bi-directional communication is recommended. The VASEAL to SEAL layer communication involves HTTP push communication (e.g. via translator 632), while the SEAL to VASEAL direction can be performed using HTTP pull communication (e.g. via translator 631). Thus, feedback can be provided via an interface that translates a format of the feedback (e.g. ROS2 topic to HTTP push) from resource monitoring and resource management functions of the VASEAL layer.

Sensor—ROS2 Process Related KPIs

The main idea to reduce the needed infrastructure can be the assumption that if the product does not have significant quality impact due to the looser network requirements (see mentioned examples), then significant cost savings can be achieved by relaxing some QoS (Quality of Service) parameters of the network.

The strict communication requirements demanded by the manufacturing processes are to meet a mostly binary defined satisfactory level: acceptable or unacceptable of the final product.

Telecommunications introduced a fine-grained MOS (Mean Opinion Score) since the 2000s to measure the human-judged overall quality of an event or experience.

In typical telecommunication services, a MOS is a ranking of the quality of voice and video sessions. Most often judged on a scale of 1 (bad) to 5 (excellent), MOS is the average of a number of individual human-scored parameters. Although originally MOS was derived from surveys of expert observers, today a MOS is often produced by an Objective Measurement Method approximating a human ranking, called EMOS (Estimated MOS).

QoE (Quality of Experience) KPIs such as video buffering time, or missing video frames are directly correlated with MOS. QoE is affected by end-to-end QoS settings such as average bandwidth or packet drop on a certain network link.

One approach is to pursue a track that has been used for decades already in MBB (Mobile BroadBand) to evaluate the perceived quality of a service of the user, extend this to the industrial and manufacturing area, and analyze a yet unexplored case how network QoS affects the quality of robotic sanding. This principle can be applied in other industrial areas where precision and process-speed requirements allow a broader range. These fields could be for example, painting, spraying, enameling, coating, iron casting, bonding, and sealing, etc.

Note that the binary acceptable or unacceptable decision on the product quality is a way forward and VASEAL architecture is still valid, though the room for the MOS/QoS maximizer node to create acceptable trade-offs is smaller.

To achieve this, we introduce an interface, a MOS topic which can be populated in the following two ways.

Mean Opinion Score Provided by the User

It can be demonstrated that industrial processes can be examined one-by-one based on their network performance requirements, and their performance can be evaluated by fast expert opinion leaving out the tedious low-level process specific KPI measurements. This option involves a human expert in the evaluation.

The Mean Opinion Scoring node 625 hosts a web server 626 which communicates with a browser 627 via websocket. The user is provided with an interface on which all the topics relayed by the UFTR in the system are enumerated. The user can group the topics by a self-defined ID which represents that a set of topics is responsible for a certain perceived MOS. After the grouping of the topics, the user can set a MOS value for the process on the scale 1-5. The websocket sends back the selected value associated with the list of topics and the Mean Opinion Scoring 625 node publishes it on the MOS topic.

Application with Built-In MOS Estimation

Beside the human focused mean opinion scoring, it is possible to estimate the MOS automatically to provide high level feedback to the content provider based on measured network QoS related KPIs.

One possible solution to provide an automatic MOS estimation for the controlled process is to compare the PID error or movement resolution of the various processes utilizing different network QoS. After every 10 Hz difference in the control loop of the two processes, the MOS score of the slower control loop is reduced by 1 unit. This is calculated in the background and published on the MOS topic.

In case both the human expert mean opinion scoring and automatic MOS estimation publishes on the MOS topic, the human-based is considered only. The MOS topic publisher has an identifier field to signal whether it comes from the human scoring system or from the automatic one.

Controller—Application Behavior Influencing Interface

Inspired by telecommunications to describe the perceived quality of transmitted voice and video by a simple MOS score, it is possible to take one step further in terms of the control or the influence of the quality of the audio and video.

3GPP TS 26.247 "Transparent end-to-end Packet-switched Streaming Service (PSS); Progressive Download and Dynamic Adaptive Streaming over HTTP (3GP-DASH)" version 17.3.0 (2023 Mar. 30) describes the working mechanism of Progressive Download and Dynamic Adaptive Streaming over HTTP (3GP-DASH).

Section 11.2.4.1 tells that the DASH client keeps consuming the media content after the presentation has begun by repeatedly requesting Media Segments or parts of Media Segments and playing content in accordance with the media presentation timeline.

With new information from its environment, such as a change in observed throughput, the client may alter Representations.

In a simple implementation, the client may change to a different Representation with any request for a Media Segment that begins with a stream access point.

One Adaptation Set's Representations all represent the same media content elements, hence all the media streams it contains are thought to be perceptually comparable.

An Adaptation set contains various attributes out of which the following three types that are influence the QoE: 1) min and max bandwidth, 2) min and max Width and Height of the frames, and 3) min and max frame rate.

From an application's (e.g., a robot controller's) perspective, the bandwidth is a consequence of the control packets size. While in audio and video encoding there are various codecs and compression rates which significantly alters the required bandwidth, in terms of control messages e.g., ROS2 standard twist message there are two vectors only which is difficult to compress further.

The resolution can refer directly to the control frequency e.g., a haptic device has usually higher control frequency or resolution than an industrial heavy duty robotic arm.

The frame rate in video codecs requires various playback speeds for the specific frame rate. In case there is inadequate network bandwidth to download the 50 FPS video in real-time then playing out with 25 FPS frame rate make more room for the network to buffer with the doubled play-out time. We can interpret this from the VAL applications point of view that slowing down the application till there is no significant degradation of production KPIs, e.g., cycle time can relax the network requirements.

Assuming the VAL application can work similarly to the DASH client, it would mean that the VAL application adapts to the network characteristics. This behavior is only required if the network's resources are depleted.

To achieve this the network requires clean interfaces on the VAL application for which the VASEAL architecture provides a possible approach.

ROS2 Implementation

The communication steps between the ROS2 and SEAL nodes when notification events occur from the network are the following.

In case the network resources get depleted, the SEAL server sends a QoS downgrade notification to the MOS/QoS ratio maximizer 690.

A topic watcher notifies the MOS/QoS ratio maximizer 690 node to spur into action which opens a topic "/application_adaptation_request" for which a ROS2 Controller (e.g. Turtle 1 Controller for specific Turtle application) subscribes.

The MOS/QoS ratio maximizer node 690 subscribes to the MOS topic of the event monitoring function 623 of the VASEAL server 611. For this topic, the Turtle 1 Controller 628 publishes estimated MOS values automatically without human interaction.

The Mean Opinion Scoring node 625 is launched which also publishes on the MOS topic for which the MOS/QoS ratio maximizer node 690 subscribes. These MOS scores can be setup by human experts.

The MOS/QOS ratio maximizer 690 calculates actions on keeping the MOS acceptable but reducing the requested QoS and e2e QoS management requests are sent towards the SEAL server 670.

There are two outcomes of these requests. One, the SEAL server can fulfill the requested QoS and responds with an Application QoS change notification. In this case we reached a new operation point. Or the second case, when the QoS requests still cannot be fulfilled and a further QoS downgrade notification arrives from the SEAL server. In this case the MOS/QoS ratio maximizer node 690 publishes an adaptation request towards the VASEAL Resource management via the "/application_adaptation_request" topic to slow down and lower the frequency of the control loop.

The MOS/QoS Ratio Maximizer in the VASEAL Architecture

According to some embodiments, a MOS/QoS maximizer function 690 in SEAL is introduced as shown in FIG. 6. In some implementations, the MOS/QoS maximizer node 690 has access to both the event monitoring 673,623 and resource management features 672,622 of both the SEAL and VASEAL servers 670,611. In this way it can collect information and have control of both the VAL and SEAL servers 620,670.

In some implementations, the MOS/QoS maximizer function 690 is disposed in the appropriate layer of the SEAL architecture (e.g. SEAL→Vertical Application Enabler Layer→Vertical Application Layer). However, the MOS/QoS maximizer node 690 can be placed other parts of the architecture. It may be more 3GPP compliant if it is implemented as an NF in the 3GPP layer, and thus it may be placed as a node in the SEAL layer.

The MOS/QoS maximizer node 690 is an example implementation of such a functionality with reinforcement learning. There can be several other controller heuristics. In some implementations, the MOS/QoS maximizer function 690 contains the industrial MOS score part in which the concept is presented on 8th May at the NOMS WS (https://noms2023.ieee-noms.org/program/workshops/2nd-ieeeifip-international-workshop-technologies-network-twins-tnt-2023-4th) entitled "Impact of Network Resource Management On Quality of Industrial Processes". The extension in this paper is the naming of the node and the introduction standardized ros2 (Robot Operating System) topic for providing both the automatic and manual MOS estimations.

According to some embodiments, interfaces are introduced between the VAL layer and the SEAL layer for communication. Translators may also be provided. Such translators can for example include a first translator 631 from HTTP to ROS2 and/or a second translator 632 from ROS2 to HTTP. In some implementations, the interfaces can influence the speed of the control process though it may not be universal and standardized as a ros2 topic.

According to some embodiments, a scoring mechanism for an industrial process is introduced.

MOS/QoS Ratio Maximizer

Figure 7:
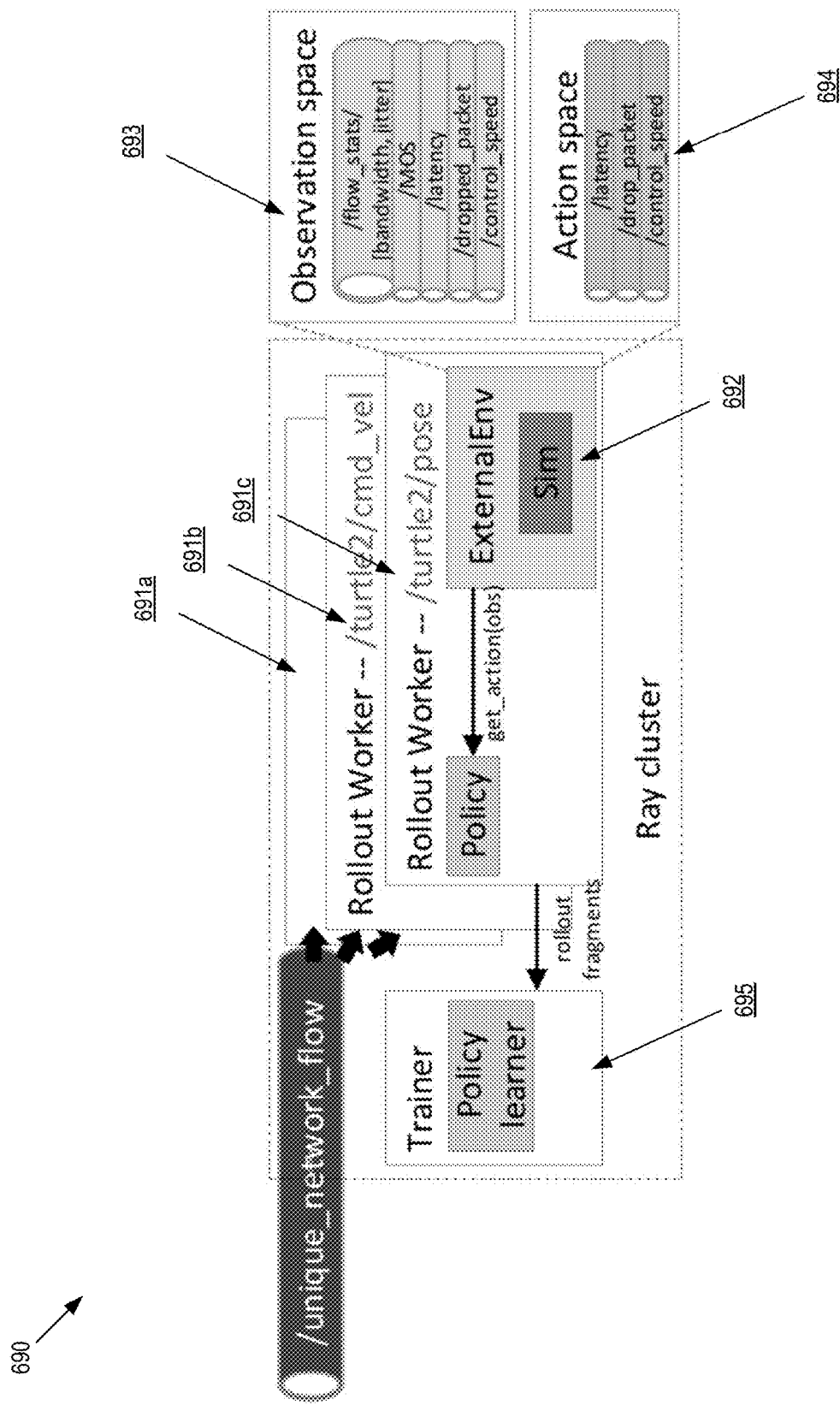
FIG. 7 is a block diagram of an example architecture of a MOS/QoS maximizer of the communication system shown in FIG. 6.

Referring now to FIG. 7, shown is a block diagram of an example architecture of the MOS/QoS maximizer 690 shown in FIG. 6. The architecture as shown is a reinforcement learning based solution, and the implementation of the MOS/QoS ratio maximizer 690 is done as a ROS2 node. However, other implementations are possible.

The output of the system is optimized policy graphs for the ROS2 topic controlling agents.

Every unique topic is handled by an associated AI-agent, a rollout worker 691a-c. The external environment 692 is the ROS2 setup.

The observation space 693 is collected by SEAL and VASEAL event monitoring functionalities providing information elements like bandwidth and jitter values of the flow statistics, MOS, latency of communication, dropped packet and control speed.

The action space 694 of the agents includes the usage of SEAL unicast resource management to setup network QoS parameters and resource management of the VASEAL layer to setup process speed. The measured latency is gathered from the network monitoring layer.

The trainer 695 can be AI-based for learning policy. Beside AI, many other types of controllers, heuristics could be used. Viability of the concept can be demonstrated, and a universal solution can be provided that can be fined-tuned easily in an application specific way. With this RL-agent it is as simple as providing the application-specific MOS-scores and fine-tune the weights in the reward function.

In the observation space, the reward is the function that enforces the learning algorithm to optimize onto it.

The reward should contain information elements on those parts that can be influenced from the action space, everything else should go into the observation space.

The weights on the reward elements influence the learning rate speed. If we set up the weights biased, then the learning rate could slow down as much that we do not see the convergence. Thus, the learning rate influences the success of learning in the end.

The reward function for each topic can for example be the following:

reward_{topic}=w_1*mos+latency_{topic}-drop_{topic}, where:
  w_1 is selected to be 200 in our measurements,
  mos is score is defined as the square error between the desired position and current position of the turtle scaled with the process speed,
  latency_topic is considered as the number of times "UFTR with Throttle" delays the packet. Its effect depends on the topic update rate.
  drop_topic means that "UFTR with Throttle" drops every nth packet of the topic. A higher value results in less drop.

Note that the reward function does not contain the VAL process speed. It is included in the MOS score provided by the VASEAL event monitoring layer. The MOS score can be defined as the square error between the desired position and current position of the actuator scaled with the process speed.

Figure 8:
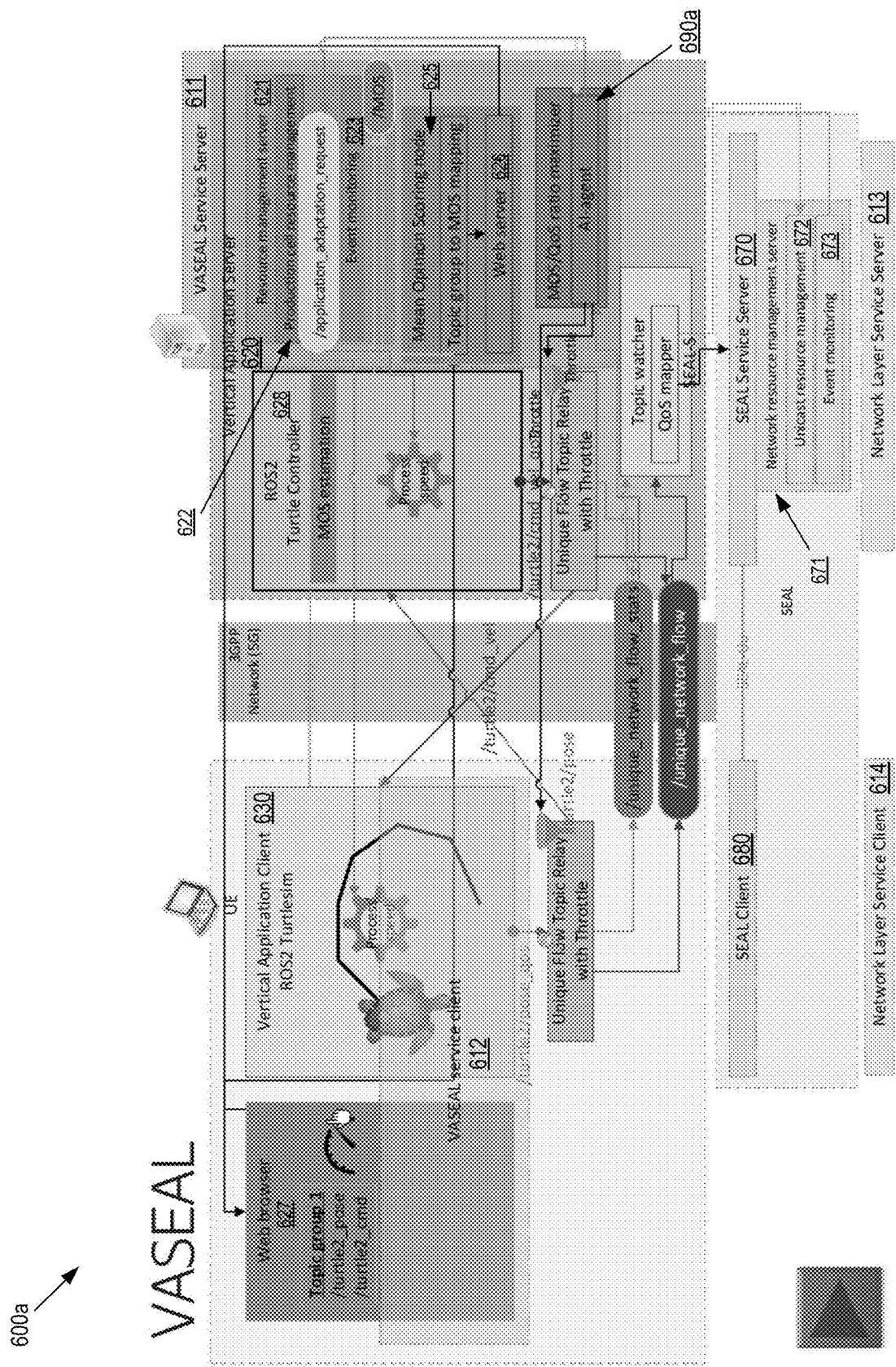
FIG. 8 is a block diagram of another communication system with a VASEAL architecture having a VASEAL layer which exposes the VAL layer towards the network.

Referring now to FIG. 8, shown is a block diagram of another communication system 600a with a VASEAL architecture having a VASEAL layer 611-614 which exposes the VAL layer towards the network. The communication system 600a of FIG. 8 is similar to the communication system 600, but there are a few differences. Notably, the communication system 600a of FIG. 8 has a MOS/QoS maximizer 690a as part of the VASEAL Service Server 611. By contrast, the communication system 600 of FIG. 6 has the MOS/QoS maximizer 690 as part of the SEAL Service Server 670. In other implementations, a MOS/QoS maximizer is implemented as an NF (Network Function).

Figure 9:
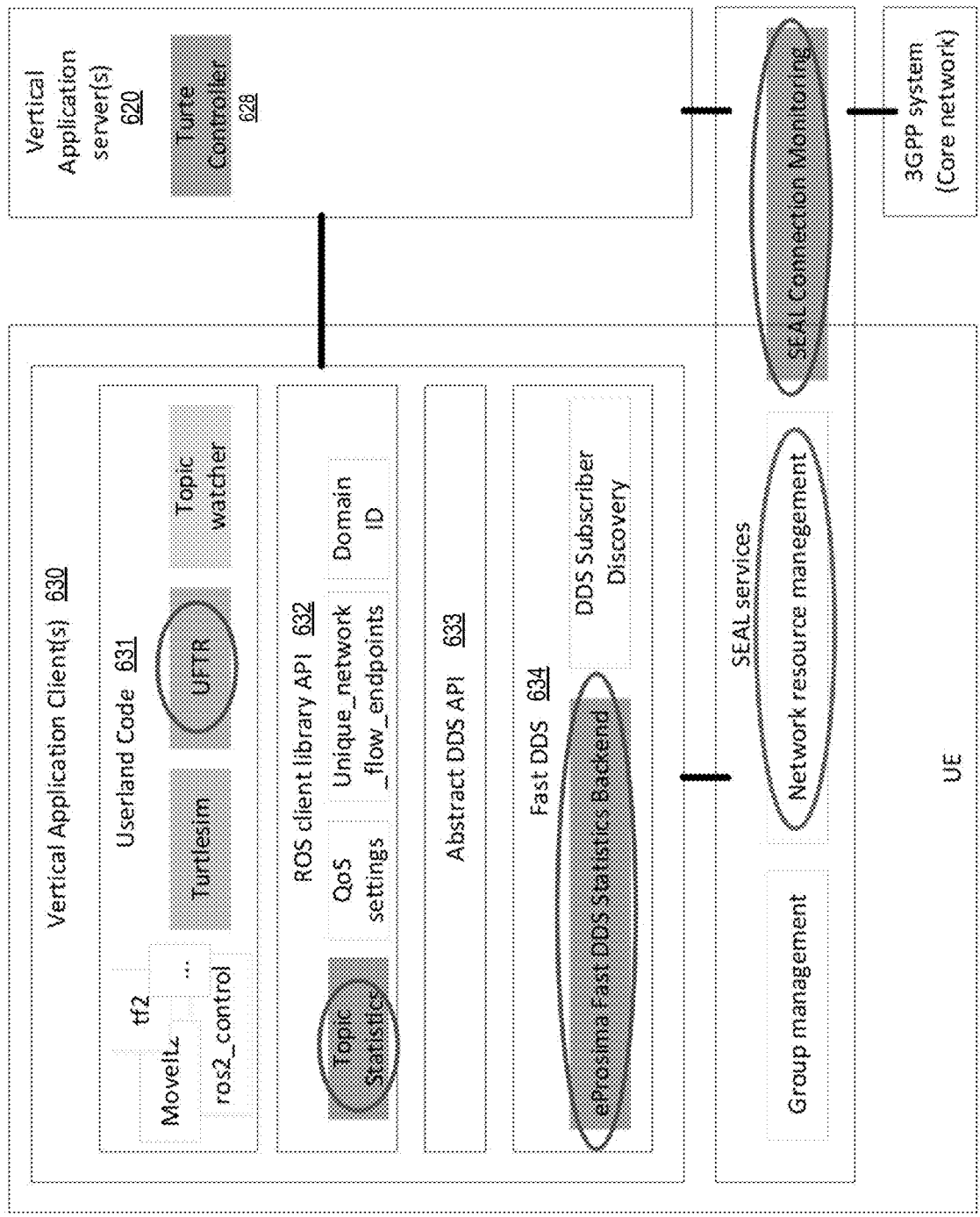
FIG. 9 is a block diagram of an example vertical application client showing source of network statistics.

Referring now to FIG. 9, shown is a block diagram of an example vertical application client 630 showing source of network statistics. The vertical application client 630 is shown with userland code 631, ROS client library APT 632, abstract DDS API 633, and fast DDS 634. The network statistics can for example include:
  The downlink packet delay in milliseconds
  The uplink packet delay in milliseconds.
  The round trip packet delay in milliseconds
  The average packet loss rate
  The average data rate
  The maximum data rate
  The average traffic volume for downlink in bytes
  The average traffic volume for uplink in bytes Note that the virtual application client 630 is very specific and is provided merely as an example. Also, different and varying network statistics are possible and may depend on the vertical application client.

Further Details

Further details are provided. It is to be understood that these details are very specific for exemplary purposes only.

Figure 10:
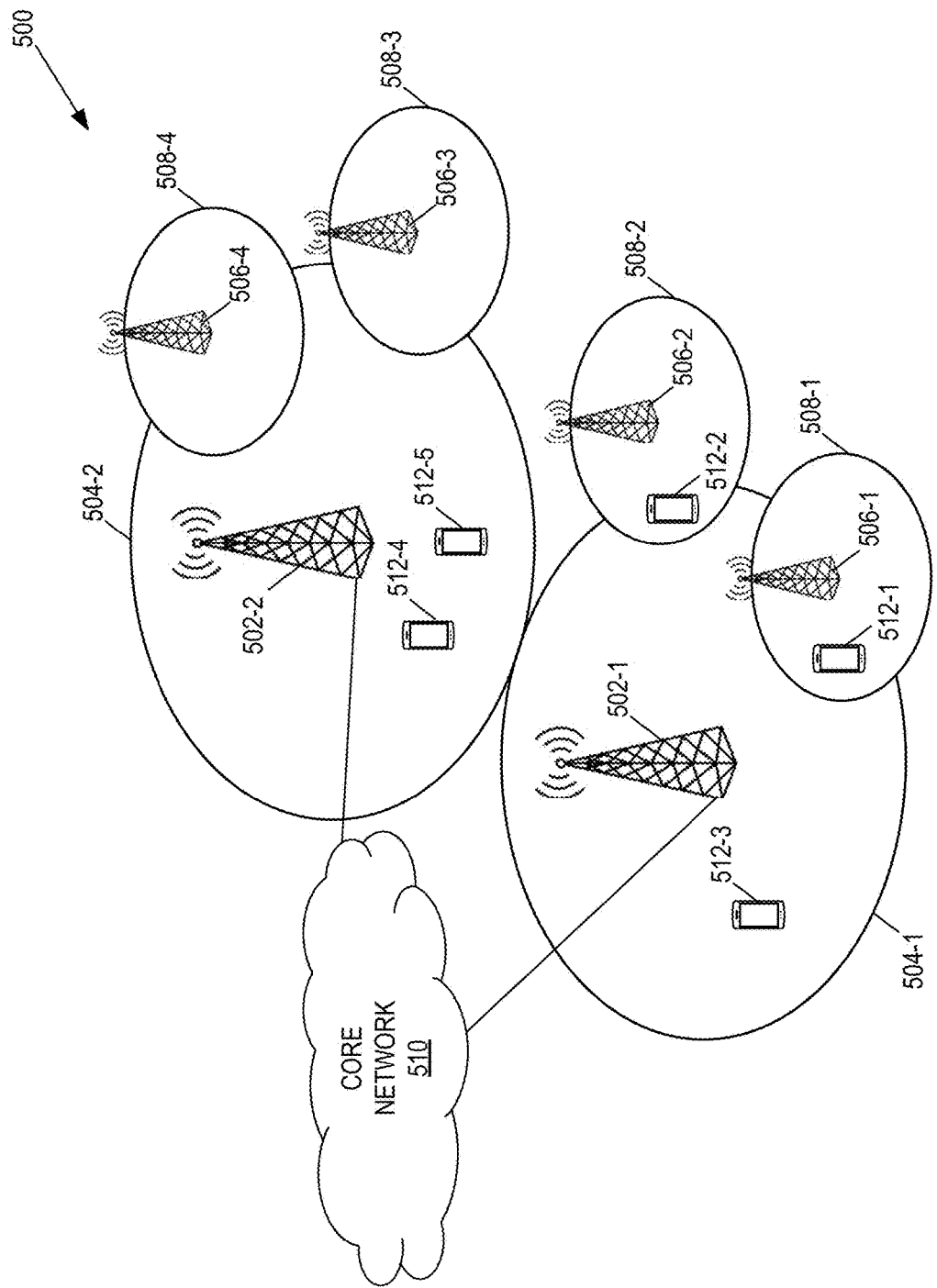
FIG. 10 is a schematic of an example cellular communications system in which some embodiments of the present disclosure may be implemented.

FIG. 10 illustrates one example of a cellular communications system 500 in which embodiments of the present disclosure may be implemented. In the embodiments described herein, the cellular communications system 500 is a 5GS (5G system) including a NG-RAN (Next Generation RAN) and a 5GC (5G Core). In this example, the RAN includes base stations 102-1 and 502-2, which in the 5GS include NR (New Radio) base stations (gNBs) and optionally next generation eNBs (ng-eNBs) (e.g., LTE RAN nodes connected to the 5GC), controlling corresponding (macro) cells 504-1 and 504-2. The base stations 502-1 and 502-2 are generally referred to herein collectively as base stations 502 and individually as base station 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small base stations (such as pico or femto base stations) or RRHs (Remote Radio Heads), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5G System (5GS) is referred to as the 5GC. The base stations 502 (and optionally the low power nodes 506) are connected to the core network 510.

The base stations 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

Figure 11:
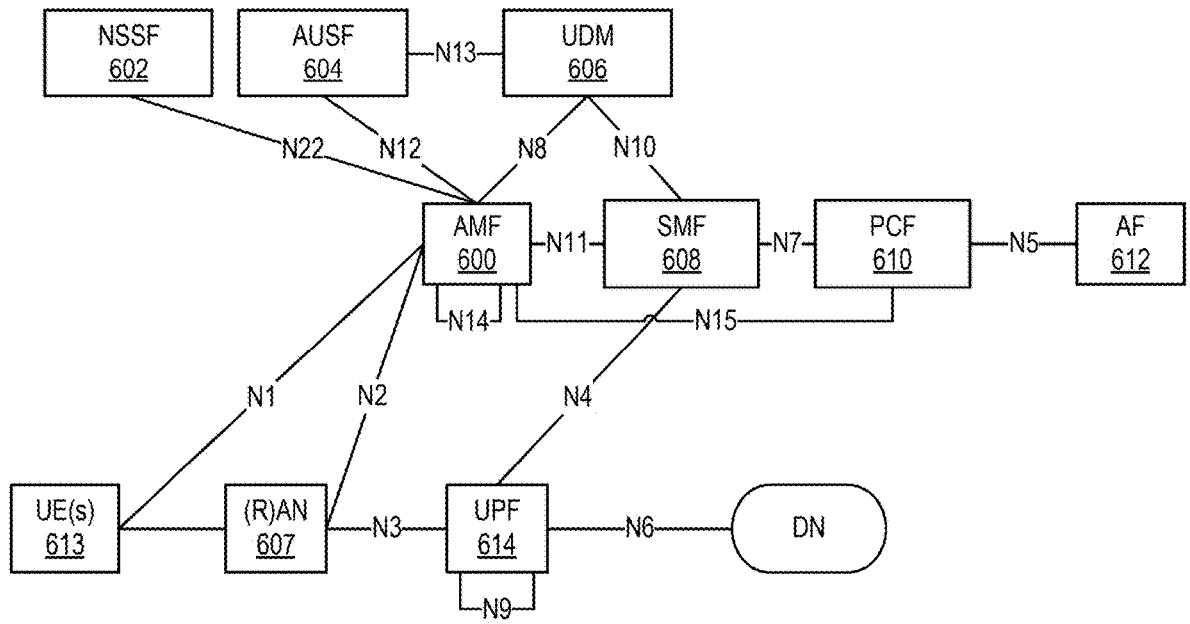
FIGS. 11 and 12 are block diagrams of a wireless communication system represented as a 5G network architecture in which some embodiments of the present disclosure may be implemented.

Referring now to FIG. 11, shown is a block diagram of a wireless communication system represented as a 5G network architecture composed of core NFs (Network Functions), where interaction between any two NFs is represented by a point-to-point reference point/interface. FIG. 11 can be viewed as one particular implementation of the system 500 of FIG. 10.

Seen from the access side the 5G network architecture shown in FIG. 11 includes a plurality of UEs 613 connected to either a RAN 607 or an (Access Network) as well as an AMF 600. Typically, the R (AN) 607 comprises base stations, e.g. such as eNBs or gNBs or similar. Seen from the core network side, the 5GC NFs shown in FIG. 11 include a NSSF 602, an AUSF 604, a UDM 606, the AMF 600, a SMF 608, a PCF 610, and an AF (Application Function) 612.

Reference point representations of the 5G network architecture are used to develop detailed call flows in the normative standardization. The N1 reference point is defined to carry signaling between the UE 613 and AMF 600. The reference points for connecting between the AN 607 and AMF 600 and between the AN 607 and UPF 614 are defined as N2 and N3, respectively. There is a reference point, N11, between the AMF 600 and SMF 608, which implies that the SMF 608 is at least partly controlled by the AMF 600. N4 is used by the SMF 608 and UPF 614 so that the UPF 614 can be set using the control signal generated by the SMF 608, and the UPF 614 can report its state to the SMF 608. N9 is the reference point for the connection between different UPFs 614, and N14 is the reference point connecting between different AMFs 600, respectively. N15 and N7 are defined since the PCF 610 applies policy to the AMF 600 and SMF 608, respectively. N12 is utilized for the AMF 600 to perform authentication of the UE 613. N8 and N10 are defined because the subscription data of the UE 613 is utilized for the AMF 600 and SMF 608.

The 5GC network aims at separating UP (User Plane) and CP (Control Plane). The UP carries user traffic while the CP carries signaling in the network. In FIG. 11, the UPF 614 is in the UP and all other NFs, i.e., the AMF 600, SMF 608, PCF 610, AF 612, NSSF 602, AUSF 604, and UDM 606, are in the CP. Separating the UP and CP guarantees each plane resource to be scaled independently. It also allows UPFs to be deployed separately from CP functions in a distributed fashion. In this architecture, UPFs may be deployed very close to UEs to shorten the RTT (Round Trip Time) between UEs and data network for some applications involving low latency.

The core 5G network architecture is composed of modularized functions. For example, the AMF 600 and SMF 608 are independent functions in the CP. Separated AMF 600 and SMF 608 allow independent evolution and scaling. Other CP functions like the PCF 610 and AUSF 604 can be separated as shown in FIG. 11. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 12:
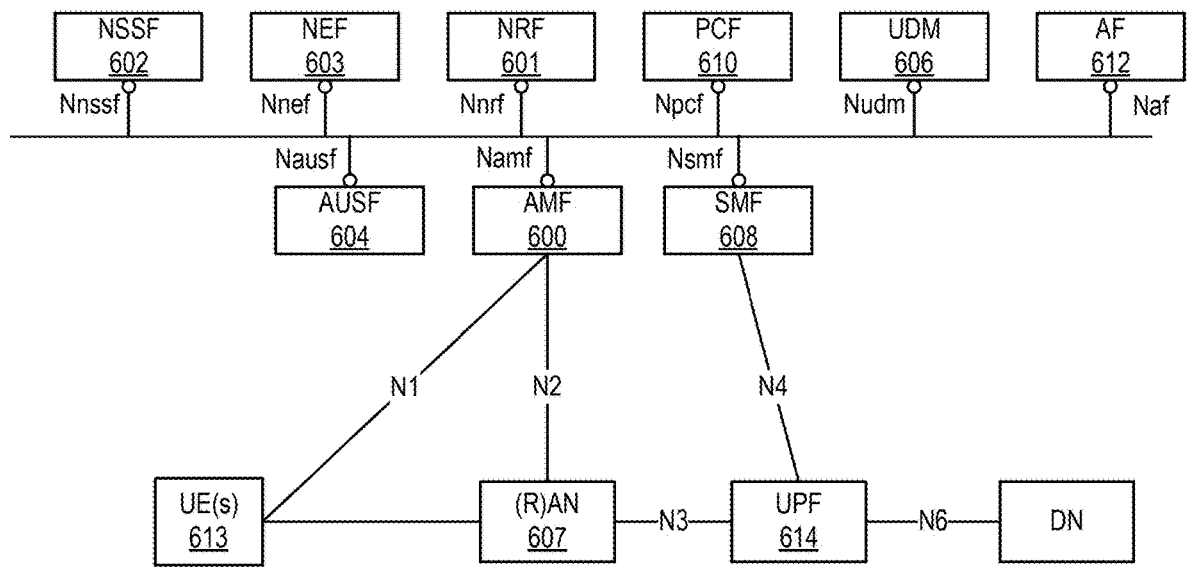

Referring now to FIG. 12, shown is a block diagram of a 5G network architecture using service-based interfaces between the NFs in the CP, instead of the point-to-point reference points/interfaces used in the 5G network architecture of FIG. 11. However, the NFs described above with reference to FIG. 12 correspond to the NFs shown in FIG. 11. The service(s) etc. that a NF provides to other authorized NFs can be exposed to the authorized NFs through the service-based interface. In FIG. 12, the service based interfaces are indicated by the letter "N" followed by the name of the NF, e.g. Namf for the service based interface of the AMF 600 and Nsmf for the service based interface of the SMF 608, etc. The NEF 603 and the NRF 601 in FIG. 12 are not shown in FIG. 11 discussed above. However, it should be clarified that all NFs depicted in FIG. 11 can interact with the NEF 603 and the NRF 601 of FIG. 12 as necessary, though not explicitly indicated in FIG. 11.

Some properties of the NFs shown in FIGS. 11 and 12 may be described in the following manner. The AMF 600 provides UE-based authentication, authorization, mobility management, etc. A UE 613 even using multiple access technologies is basically connected to a single AMF 600 because the AMF 600 is independent of the access technologies. The SMF 608 is responsible for session management and allocates IP (Internet Protocol) addresses to UEs. It also selects and controls the UPF 614 for data transfer. If a UE 613 has multiple sessions, different SMFs 608 may be allocated to each session to manage them individually and possibly provide different functionalities per session. The AF 612 provides information on the packet flow to the PCF 610 responsible for policy control in order to support QoS. Based on the information, the PCF 610 determines policies about mobility and session management to make the AMF 600 and SMF 608 operate properly. The AUSF 604 supports authentication function for UEs or similar and thus stores data for authentication of UEs or similar while the UDM 606 stores subscription data of the UE 613. The DN (Data Network), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 13:
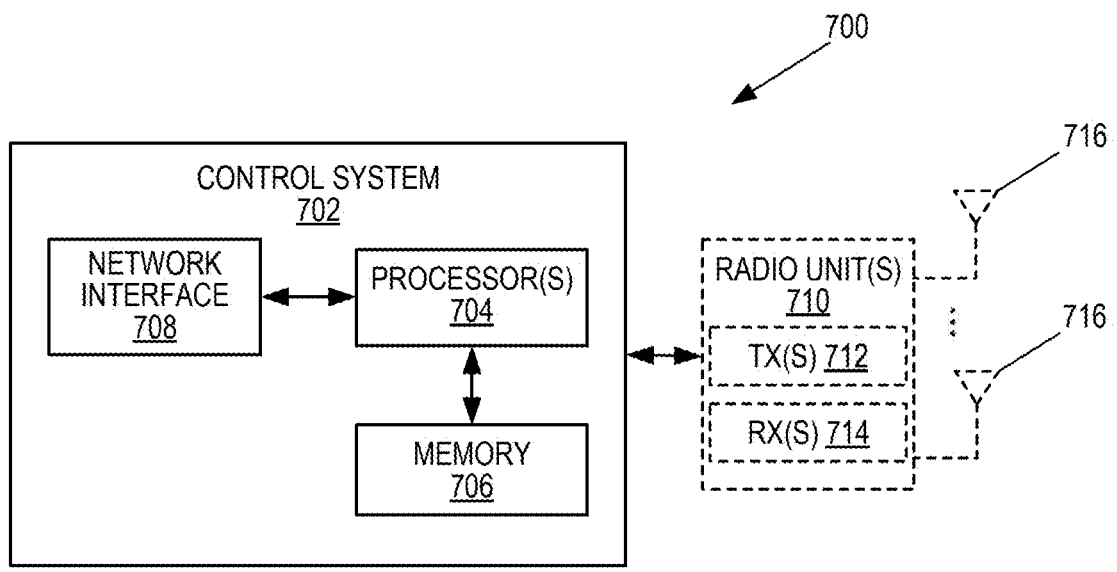
FIGS. 13 and 15 are block diagrams of a radio access node according to some embodiments of the present disclosure.

FIG. 13 is a schematic block diagram of a radio access node 700 according to some embodiments of the present disclosure. Optional features are represented by dashed boxes. The radio access node 700 may be, for example, a base station 102 or 106 or a network node that implements all or part of the functionality of the base station 102 or gNB described herein. As illustrated, the radio access node 700 includes a control system 702 that includes one or more processors 704 (e.g., CPUs (Central Processing Units), ASICs (Application Specific Integrated Circuits), FPGAs (Field Programmable Gate Arrays), and/or the like), memory 706, and a network interface 708. The one or more processors 704 are also referred to herein as processing circuitry. In addition, the radio access node 700 may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 14:
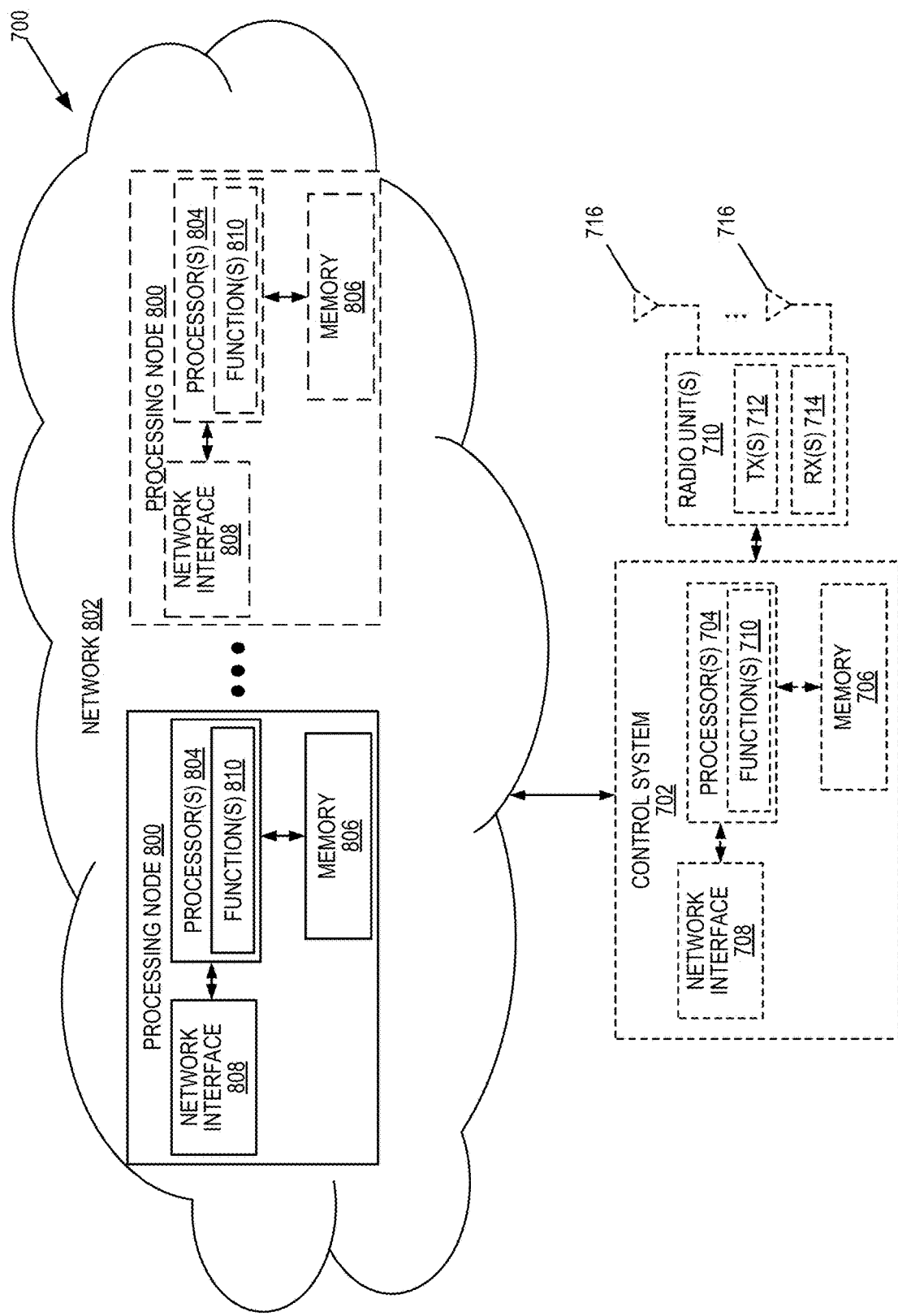
FIG. 14 is a block diagram that illustrates a virtualized embodiment of a radio access node according to some embodiments of the present disclosure.

FIG. 14 is a schematic block diagram that illustrates a virtualized embodiment of the radio access node 700 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 may include the control system 702 and/or the one or more radio units 710, as described above. The control system 702 may be connected to the radio unit(s) 710 via, for example, an optical cable or the like. The radio access node 700 includes one or more processing nodes 800 coupled to or included as part of a network(s) 802. If present, the control system 702 or the radio unit(s) 710 are connected to the processing node(s) 800 via the network 802. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the one or more processing nodes 800 and the control system 802 and/or the radio unit(s) 810 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 802 is used in order to carry out at least some of the desired functions 810. Notably, in some embodiments, the control system 802 may not be included, in which case the radio unit(s) 810 communicates directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
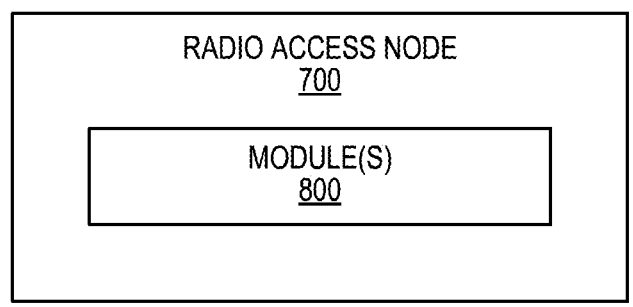

FIG. 15 is a schematic block diagram of the radio access node 700 according to some other embodiments of the present disclosure. The radio access node 700 includes one or more modules 800, each of which is implemented in software. The module(s) 800 provide the functionality of the radio access node 700 described herein. This discussion is equally applicable to the processing node 700 of FIG. 14 where the modules 800 may be implemented at one of the processing nodes 700 or distributed across multiple processing nodes 700 and/or distributed across the processing node(s) 700 and the control system 702.

Figure 16:
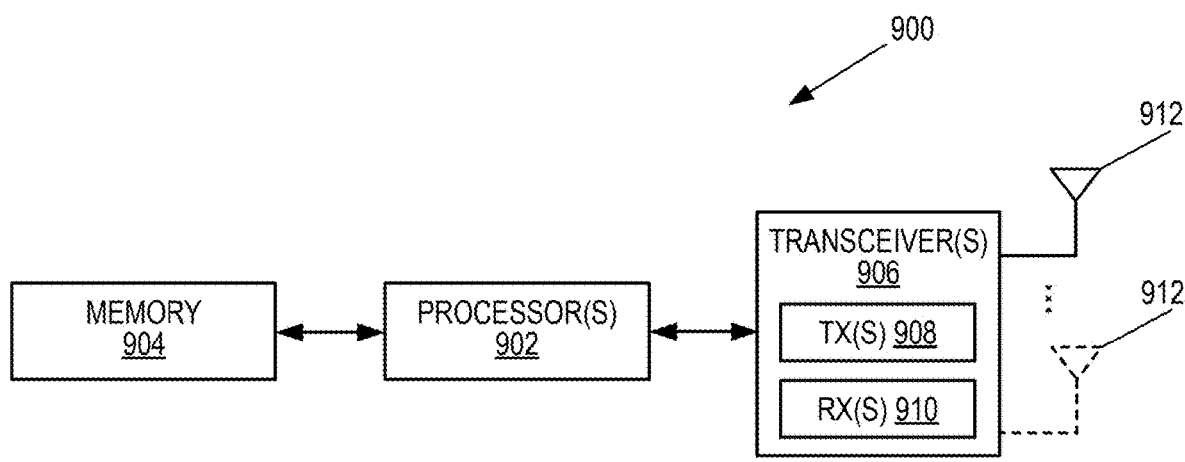
FIGS. 16 and 17 are block diagrams of a wireless communication device.

FIG. 16 is a schematic block diagram of a wireless communication device 900 according to some embodiments of the present disclosure. As illustrated, the wireless communication device 900 includes one or more processors 902 (e.g., CPUs, ASICS, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
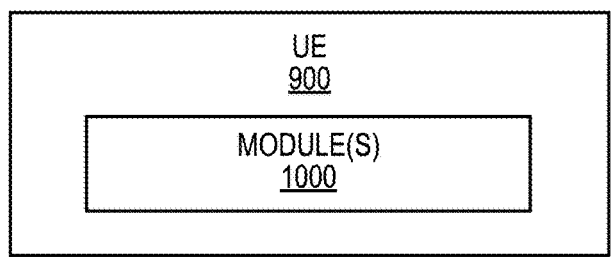

FIG. 17 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900 described herein.

Each station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloud-implemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

Figure 18:
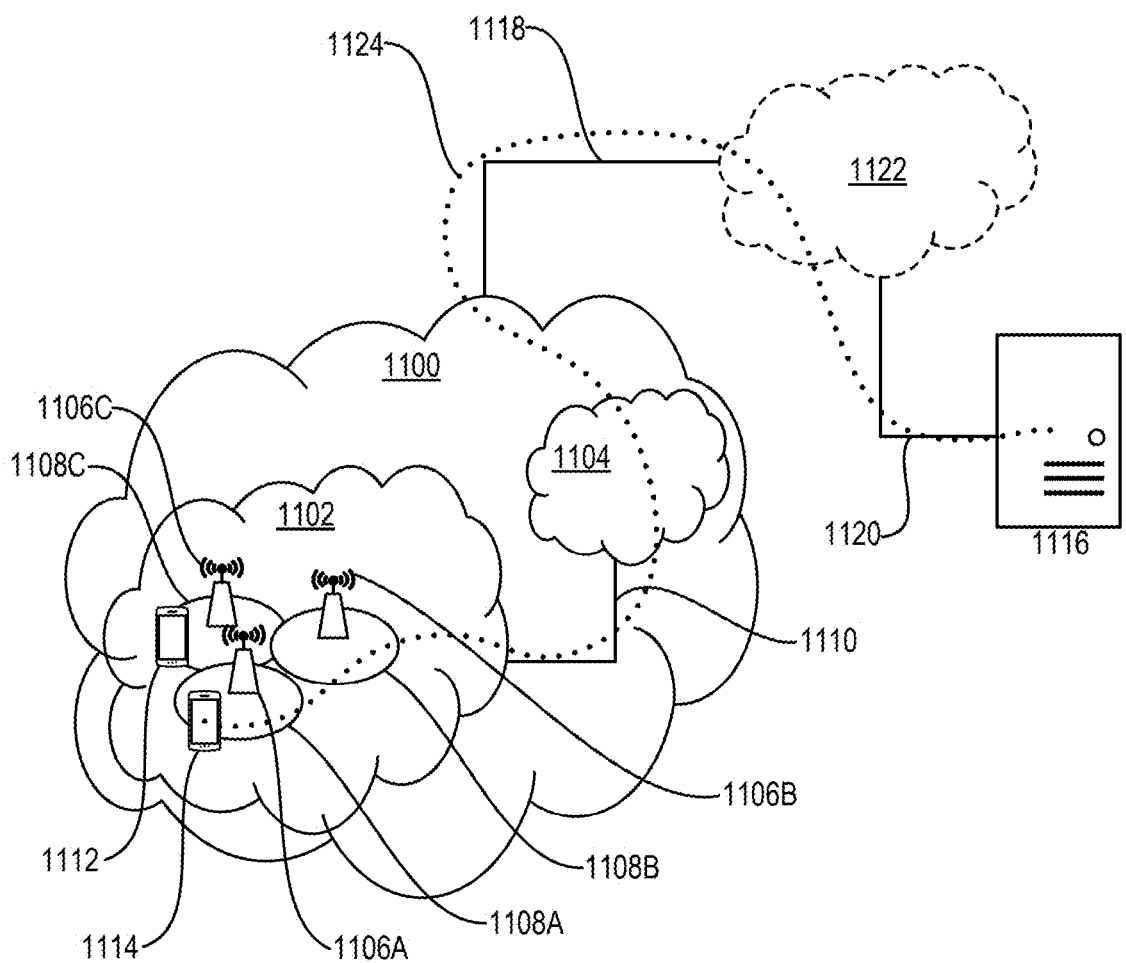
FIG. 18 is a schematic of an example communication system according to some embodiments of the present disclosure.

The communication system of FIG. 18 as a whole enables connectivity between the connected UEs 1112, 1114 and the host computer 1116. The connectivity may be described as an OTT (Over-the-Top) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs (Digital Signal Processor), special-purpose digital logic, and the like. The processing circuitry may be configured to execute program code stored in memory, which may include one or several types of memory such as ROM (Read Only Memory), RAM (Random Access Memory), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Numerous modifications and variations of the present disclosure are possible in light of the above teachings. It is therefore to be understood that within the scope of the appended claims, the disclosure may be practised otherwise than as specifically described herein.

We claim:

1. A method for execution by a SEAL (Service Enabler Architecture Layer) service server of a network, comprising:
    determining a communication policy based on at least one KPI (Key Performance Indicator); and
    communicating, via the network, with a SEAL client of a communications device, in accordance with the communication policy.

2. The method of claim 1, wherein determining the communication policy comprises:
    implementing machine learning to identify the communication policy out of a plurality of possible communication policies which maximizes a reward function based on the at least one KPI.

3. The method of claim 1, wherein the at least one KPI comprises at least one of MOS (Mean Opinion Score) representing quality, latency of communication, and packet drop of communication.

4. The method of claim 1, wherein the at least one KPI comprises MOS (Mean Opinion Score) representing quality, latency of communication, and packet drop of communication.

5. The method of claim 1, wherein the SEAL service server is part of a SEAL layer, and wherein the method further comprises:
    receiving feedback from a VASEAL (Vertical Application Service Enabling Architecture Layer) layer which is separate from the SEAL layer; and
    controlling the VASEAL layer and/or adjusting the communication policy based in part on the feedback.

6. The method of claim 5, wherein receiving the feedback comprises:
    receiving the feedback via an interface that translates a format of the feedback from resource monitoring and resource management functions of the VASEAL layer.

7. A non-transitory computer readable medium having recorded thereon statements and instructions that, when executed by a processor of a SEAL (Service Enabler Architecture Layer) service server, configure the SEAL service server to implement a method according to claim 1.

8. A SEAL (Service Enabler Architecture Layer) service server, comprising:
    a network interface configured to communicate with other network nodes; and
    circuitry coupled to the network interface and configured to determine a communication policy based on at least one KPI (Key Performance Indicator), and communicate with a SEAL client of a communications device via the network interface, in accordance with the communication policy.

9. The SEAL service server of claim 8, wherein the circuitry is configured to determine the communication policy by implementing machine learning to identify the communication policy out of a plurality of possible communication policies which maximizes a reward function based on the at least one KPI.

10. The SEAL service server of claim 8, wherein the at least one KPI comprises at least one of MOS (Mean Opinion Score) representing quality, latency of communication, and packet drop of communication.

11. The SEAL service server of claim 8, wherein the at least one KPI comprises MOS (Mean Opinion Score) representing quality, latency of communication, and packet drop of communication.

12. The SEAL service server of claim 8, wherein the SEAL service server is part of a SEAL layer, and wherein the circuitry is configured to receive feedback from a VASEAL (Vertical Application Service Enabling Architecture Layer) layer which is separate from the SEAL layer, and control the VASEAL layer and/or adjust the communication policy based in part on the feedback.

13. The SEAL service server of claim 12, wherein the feedback is received via an interface that translates a format of the feedback from resource monitoring and resource management functions of the VASEAL layer.

14. A method for execution by a VASEAL (Vertical Application Service Enabling Architecture Layer) service server of a network, wherein the VASEAL service server is part of a VASEAL layer, the method comprising:
    monitoring at least one KPI (Key Performance Indicator); and
    sending feedback to a SEAL (Service Enabler Architecture Layer) layer which is separate from the VASEAL layer based on the at least one KPI.

15. The method of claim 14, wherein the at least one KPI comprises at least one of MOS (Mean Opinion Score) representing quality, latency of communication, and packet drop of communication.

16. The method of claim 14, wherein the at least one KPI comprises MOS (Mean Opinion Score) representing quality, latency of communication, and packet drop of communication.

17. The method of claim 14, wherein sending the feedback comprises:
    sending the feedback via an interface that translates a format of the feedback from resource monitoring and resource management functions of the VASEAL layer.

18. A non-transitory computer readable medium having recorded thereon statements and instructions that, when executed by a processor of a VASEAL (Vertical Application Service Enabling Architecture Layer) service server, configure the VASEAL service server to implement a method according to claim 14.

19. A VASEAL (Vertical Application Service Enabling Architecture Layer) service server, comprising:
    a network interface configured to communicate with other network nodes; and
    circuitry coupled to the network interface and configured to monitor at least one KPI (Key Performance Indicator), and send feedback via the network interface to a SEAL (Service Enabler Architecture Layer) layer which is separate from the VASEAL layer based on the at least one KPI.

20. The VASEAL service server of claim 19, wherein the feedback is sent via an interface that translates a format of the feedback from resource monitoring and resource management functions of the VASEAL layer.

* * * * *